(12) United States Patent
Take

(10) Patent No.: US 11,469,048 B2
(45) Date of Patent: Oct. 11, 2022

(54) MULTI-LAYER CERAMIC ELECTRONIC COMPONENT AND METHOD OF PRODUCING THE SAME

(71) Applicant: TAIYO YUDEN CO., LTD., Tokyo (JP)

(72) Inventor: Yoshinari Take, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 17/142,907

(22) Filed: Jan. 6, 2021

(65) Prior Publication Data

US 2021/0225592 A1 Jul. 22, 2021

(30) Foreign Application Priority Data

Jan. 21, 2020 (JP) .............................. JP2020-007592

(51) Int. Cl.
| | |
|---|---|
| *H01G 4/232* | (2006.01) |
| *H01G 13/00* | (2013.01) |
| *H01G 4/30* | (2006.01) |

(52) U.S. Cl.
CPC .............. *H01G 4/232* (2013.01); *H01G 4/30* (2013.01); *H01G 13/006* (2013.01)

(58) Field of Classification Search
CPC ........ H01G 4/232; H01G 4/30; H01G 13/006; H01G 4/248; H01G 4/252; H01G 4/22
See application file for complete search history.

(56) References Cited

U.S. PATENT DOCUMENTS

| | | | | | |
|---|---|---|---|---|---|
| 3,118,095 | A | * | 1/1964 | Baron | H01G 4/232 361/321.1 |
| 6,038,121 | A | * | 3/2000 | Naito | H01G 4/232 361/308.1 |
| 6,407,906 | B1 | * | 6/2002 | Ahiko | H01G 4/228 361/306.1 |
| 7,495,885 | B2 | * | 2/2009 | Togashi | H01G 4/30 361/321.1 |
| 8,081,416 | B2 | * | 12/2011 | Lee | H01G 4/232 361/306.3 |
| 8,194,389 | B2 | * | 6/2012 | Lee | H01G 4/005 361/306.3 |

(Continued)

FOREIGN PATENT DOCUMENTS

JP 2019024077 A 2/2019

*Primary Examiner* — Dion R. Ferguson
(74) *Attorney, Agent, or Firm* — Law Office of Katsuhiro Arai

(57) ABSTRACT

A multi-layer ceramic electronic component includes a ceramic body and an external electrode. The ceramic body includes a first side surface facing in a direction of a first axis, a second side surface facing in a direction of a second axis orthogonal to the first axis, a ridge that connects the first side surface and the second side surface to each other, and internal electrodes laminated along a third axis orthogonal to the first axis and the second axis and led out in a lead-out region. The external electrode includes a protrusion provided at a position along the ridge and protruding in the directions of the first axis and the second axis, and a first base portion and a second base portion extending from the protrusion along the first side surface and the second side surface, respectively, the external electrode covering the lead-out region.

13 Claims, 14 Drawing Sheets

(56) References Cited

U.S. PATENT DOCUMENTS

| | | | | |
|---|---|---|---|---|
| 8,310,808 B2* | 11/2012 | Togashi | ................ | H01G 4/232 |
| | | | | 361/321.2 |
| 8,472,160 B2* | 6/2013 | Takeuchi | ................ | H01G 4/30 |
| | | | | 361/306.3 |
| 2008/0074825 A1* | 3/2008 | Togashi | ................ | H01G 4/232 |
| | | | | 361/306.3 |
| 2008/0180877 A1* | 7/2008 | Togashi | ................ | H01G 4/30 |
| | | | | 361/301.4 |
| 2009/0053853 A1* | 2/2009 | Onodera | ................ | H01G 4/30 |
| | | | | 438/106 |
| 2009/0213525 A1* | 8/2009 | Lee | ................ | H01G 4/30 |
| | | | | 361/303 |
| 2009/0279228 A1* | 11/2009 | Lee | ................ | H01G 4/012 |
| | | | | 361/301.4 |
| 2011/0235232 A1* | 9/2011 | Takeuchi | ................ | H01G 4/01 |
| | | | | 361/301.1 |
| 2013/0229749 A1* | 9/2013 | Lee | ................ | H01G 4/30 |
| | | | | 156/89.12 |
| 2016/0189867 A1* | 6/2016 | Zaima | ................ | H01G 4/35 |
| | | | | 361/301.4 |
| 2019/0027312 A1* | 1/2019 | Muramatsu | ............ | H01G 4/012 |
| 2019/0066921 A1* | 2/2019 | Cho | ................ | H01G 4/12 |
| 2019/0080843 A1* | 3/2019 | Jang | ................ | H01G 4/30 |
| 2021/0225592 A1* | 7/2021 | Take | ................ | H01G 4/232 |

* cited by examiner

MULTI-LAYER CERAMIC ELECTRONIC COMPONENT AND METHOD OF PRODUCING THE SAME

BACKGROUND ART

The present disclosure relates to a multi-layer ceramic electronic component including an external electrode and to a method of producing the multi-layer ceramic electronic component.

In high-frequency communication devices such as portable terminal devices, a multi-layer ceramic capacitor is used in a wide range of applications such as decoupling of an IC power-supply line. The multi-layer ceramic capacitor has a configuration in which a plurality of internal electrodes laminated in a ceramic body are alternately led out to a pair of external electrodes (see, for example, Japanese Patent Application Laid-open No. 2019-24077).

SUMMARY OF THE INVENTION

In order to achieve a reduction in height and high performance and to reduce equivalent series resistance (ESR) and equivalent series inductance (ESL), it is advantageous for the multi-layer ceramic capacitor to have a thin external electrode. However, in the multi-layer ceramic capacitor, as the external electrode is thinner, a short circuit is more liable to occur due to the entry of moisture into the ceramic body or the like.

In the ceramic body, a crack formed from the surface toward the inside is mainly an entry path of moisture. Thus, the multi-layer ceramic capacitor is more liable to cause a short circuit particularly when an excessively thin portion of the external electrode and a portion where a crack is present in the ceramic body overlap each other.

In view of the circumstances as described above, it is desirable to provide a technique capable of thinning the external electrode without impairing the reliability of the multi-layer ceramic electronic component.

Additional or separate features and advantages of the disclosure will be set forth in the descriptions that follow and in part will be apparent from the description, or may be learned by practice of the disclosure. The objectives and other advantages of the disclosure will be realized and attained by the structure particularly pointed out in the written description and claims thereof as well as the appended drawings.

To achieve these and other advantages and in accordance with the purpose of the present disclosure, as embodied and broadly described, in one aspect, the present disclosure provides a multi-layer ceramic electronic component including a ceramic body and an external electrode.

The ceramic body includes a first side surface facing in a direction of a first axis, a second side surface facing in a direction of a second axis orthogonal to the first axis, a ridge that connects the first side surface and the second side surface to each other, and internal electrodes laminated along a third axis orthogonal to the first axis and the second axis and led out in a lead-out region.

The external electrode includes a protrusion provided at a position along the ridge and protruding in the directions of the first axis and the second axis, and a first base portion and a second base portion extending from the protrusion along the first side surface and the second side surface, respectively. The external electrode covers the lead-out region.

The protrusion may extend along the ridge.

The protrusion may be provided at at least one of both ends of the ridge in a direction of the third axis.

In such a multi-layer ceramic electronic component, the thickness of the external electrode is large in the protrusion formed along the ridge of the ceramic body. Thus, in the ceramic body, the ridge susceptible to an external shock is reliably protected from the external environment by the protrusion of the external electrode, and thus the entry of moisture to the inside can be prevented from occurring even if the ridge has cracks. This allows a short circuit to be effectively prevented from occurring in the multi-layer ceramic capacitor. Additionally, in such a multi-layer ceramic electronic component, the thickness of the protrusion of the external electrode is enlarged, whereas the thicknesses of the first and second base portions are kept small, so that the ESR and the ESL can be reduced, and the occurrence of the peeling of the external electrode can also be suppressed.

The lead-out region may include the ridge.

In the ceramic body including the internal electrodes exposed in the ridge, a short circuit resulting from the entry of moisture into the ridge is more liable to occur. In this configuration, the above-mentioned effect of suppressing a short circuit is more effectively obtained.

The external electrode may further include a plating layer and an underlayer disposed between the plating layer and the lead-out region.

The underlayer may include a sputtered film.

In this configuration, the underlayer can be thinned, and thus the thicknesses of the first and second base portions in the external electrode can further be kept small.

A maximum dimension of the multi-layer ceramic electronic component in a direction of the third axis may be smaller than maximum dimensions of the multi-layer ceramic electronic component in the directions of the first axis and the second axis.

The maximum dimension of the multi-layer ceramic electronic component in the direction of the third axis may be 50 µm or more and 150 µm or less.

The maximum dimension of the multi-layer ceramic electronic component in the direction of the third axis may be 60 µm or more and 120 µm or less.

The maximum dimension of the multi-layer ceramic electronic component in the direction of the third axis may be 60 µm or more and 75 µm or less.

In another aspect, the present disclosure provides a method of producing a multi-layer ceramic electronic component, the method including: preparing a ceramic body including a first side surface facing in a direction of a first axis, a second side surface facing in a direction of a second axis orthogonal to the first axis, a ridge that connects the first side surface and the second side surface to each other, and internal electrodes laminated along a third axis orthogonal to the first axis and the second axis and led out in a lead-out region; forming an underlayer in the lead-out region by a vacuum film deposition method; and forming a plating layer including a protrusion extending along the ridge and protruding in the directions of the first axis and the second axis, and a first base portion and a second base portion extending from the protrusion along the first side surface and the second side surface, respectively, the plating layer covering the lead-out region via the underlayer.

The lead-out region may include the ridge.

The forming a plating layer may include forming a reinforcing layer that extends along the ridge, and forming a covering layer that covers the lead-out region over the reinforcing layer.

The vacuum film deposition method may include a sputtering method.

As described above, according to the present disclosure, it is possible to provide a technique capable of thinning the external electrode while ensuring high reliability of the multi-layer ceramic electronic component.

These and other objects, features and advantages of the present disclosure will become more apparent in light of the following detailed description of embodiments thereof, as illustrated in the accompanying drawings.

It is to be understood that both the foregoing general description and the following detailed description are exemplary and explanatory, and are intended to provide further explanation of the disclosure as claimed.

DETAILED DESCRIPTION OF THE EMBODIMENTS

Hereinafter, multi-layer ceramic capacitors 10 and 20 according to first and second embodiments of the present disclosure will be described with reference to the drawings. Note that the drawings show an X axis, a Y axis, and a Z axis orthogonal to one another as appropriate. The X axis, the Y axis, and the Z axis are common in all of the figures and define a fixed coordinate system that is fixed with respect to the multi-layer ceramic capacitors 10 and 20.

I First Embodiment

1. Configuration of Multi-Layer Ceramic Capacitor 10
1.1 Overall Configuration

Figure 1:
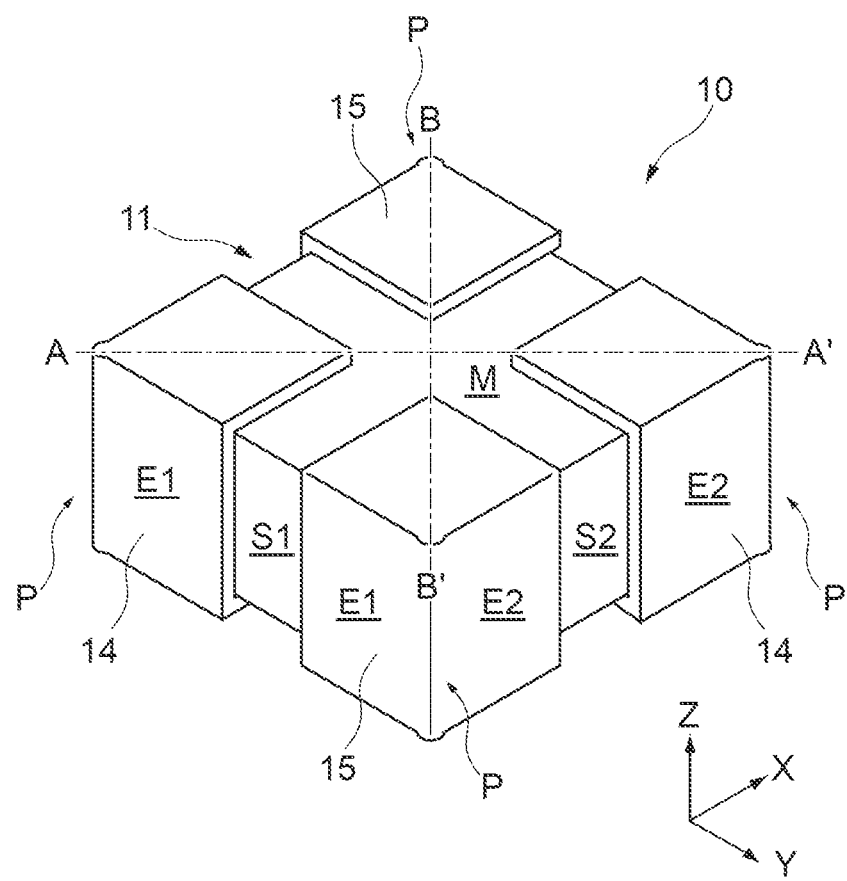
FIG. 1 is a perspective view of a multi-layer ceramic capacitor according to a first embodiment of the present disclosure.

FIG. 1 is a perspective view of the multi-layer ceramic capacitor 10 according to the first embodiment of the present disclosure. The multi-layer ceramic capacitor 10 includes a ceramic body 11, a pair of first external electrodes 14, and a pair of second external electrodes 15. The pair of first external electrodes 14 and the pair of second external electrodes 15 are provided apart from each other on the outer surface of the ceramic body 11.

Figure 2:
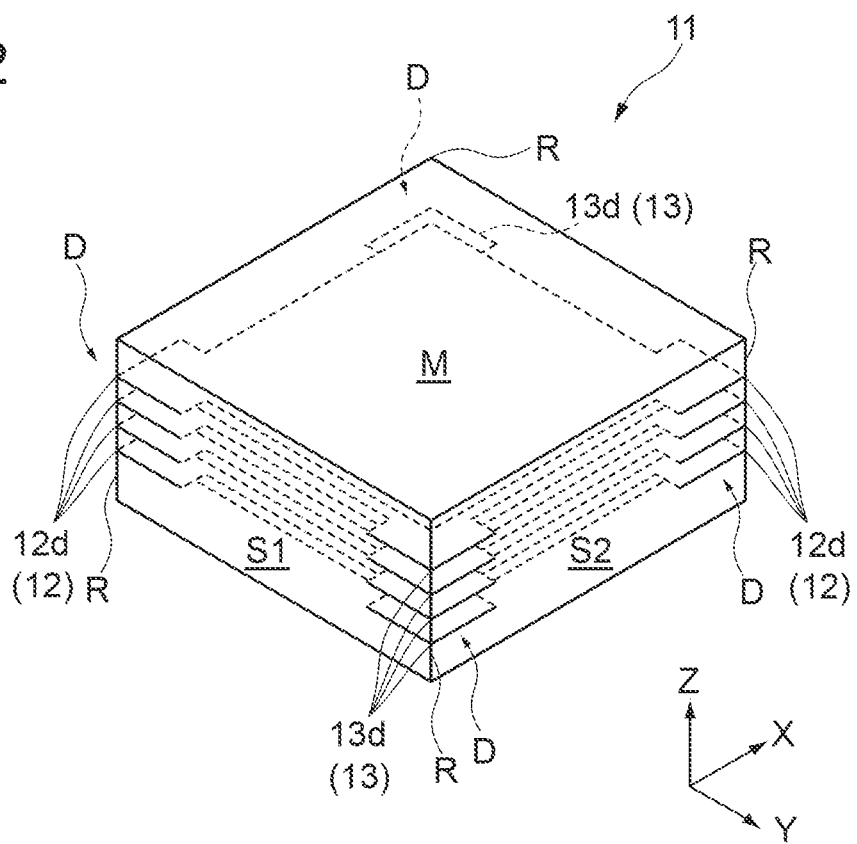
FIG. 2 is a perspective view of a ceramic body of the multi-layer ceramic capacitor.

FIG. 2 is a perspective view of the ceramic body 11. The ceramic body 11 is typically configured as a hexahedron. Specifically, the ceramic body 11 has a pair of first side surfaces S1 extending along the Y-Z plane, a pair of second side surfaces S2 extending along the X-Z plane, and a pair of main surfaces M extending along the X-Y plane.

The first side surfaces S1, the second side surfaces S2, and the main surfaces M of the ceramic body 11 are each configured as a flat surface. The flat surface according to this embodiment does not need to be strictly flat if the surface may be recognized as being flat when viewed as a whole. For example, the flat surface according to this embodiment also includes a surface having fine irregularities thereon, a surface having a gently curved shape in a predetermined range, and the like.

Additionally, the ceramic body 11 includes four ridges R that connect the pair of first side surfaces S1 and the pair of second side surfaces S2 to each other. Each of the ridges R is typically formed as a convexly curved surface, which smoothly connects the first side surface S1 and the second side surface S2 to each other. However, the ridge R is not limited to such a configuration and may be, for example, a line of intersection that directly connects the first side surface S1 and the second side surface S2 to each other.

Figure 3:
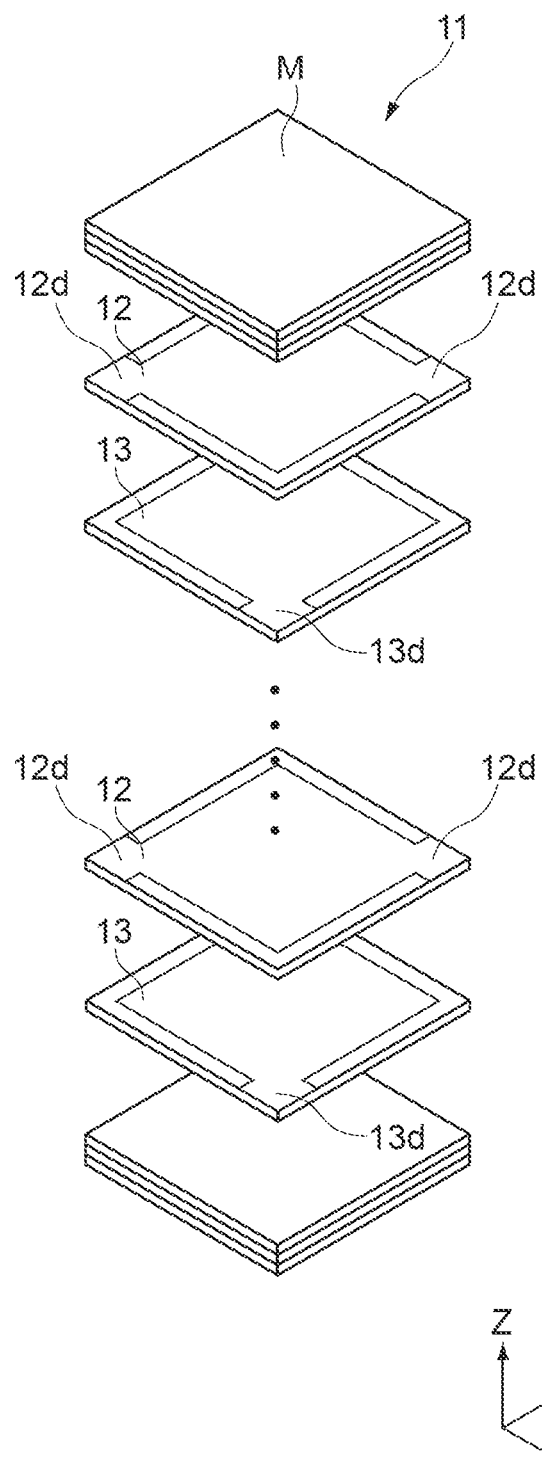
FIG. 3 is an exploded perspective view of the ceramic body.

The ceramic body 11 has a rectangular planar shape along the X-Y plane and has a configuration in which a plurality of flat plate-like ceramic layers are laminated in the Z-axis direction. FIG. 3 is an exploded perspective view of a part of the laminated structure of the ceramic body 11. The ceramic body 11 includes a plurality of first internal electrodes 12 and a plurality of second internal electrodes 13. The first and second internal electrodes 12 and 13 each have a sheet-like shape extending along the X-Y plane.

The first and second internal electrodes 12 and 13 are each formed of a good conductor of electricity. Examples of the good conductor of electricity forming the first and second internal electrodes 12 and 13 typically include nickel (Ni), and other than nickel (Ni), include a metal mainly containing copper (Cu), palladium (Pd), platinum (Pt), silver (Ag), gold (Au), or the like or an alloy of them.

In the ceramic body 11, the first internal electrodes 12 and the second internal electrodes 13 are alternately disposed between the ceramic layers along the Z-axis direction and face each other in the Z-axis direction. The ceramic body 11 includes lead-out regions D, each of which extends from a corresponding ridge R along the first and second side surfaces S1 and S2, and in each of which the first internal electrodes 12 or the second internal electrodes 13 are led out.

Figure 4:
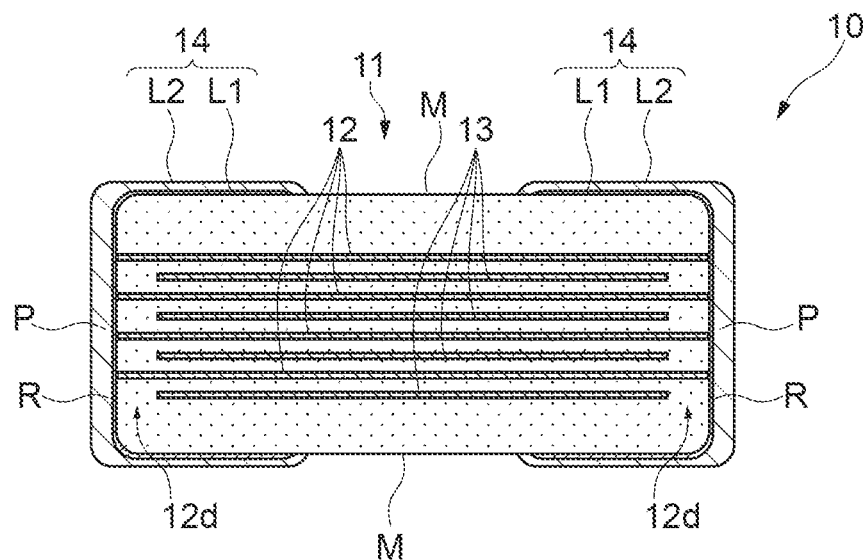
FIG. 4 is a cross-sectional view of the multi-layer ceramic capacitor taken along the diagonal line A-A' in FIG. 1.
Figure 5:
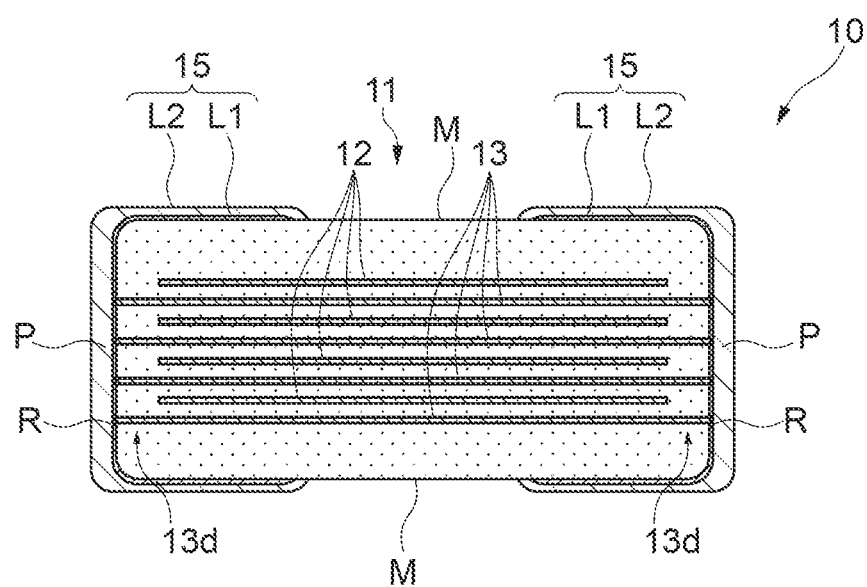
FIG. 5 is a cross-sectional view of the multi-layer ceramic capacitor taken along the diagonal line B-B' in FIG. 1.

FIG. 1 shows the diagonal line A-A' and the diagonal line B-B' on the rectangular planar shape of the ceramic body 11 of the multi-layer ceramic capacitor 10. FIG. 4 is a cross-sectional view of the multi-layer ceramic capacitor 10 taken along the diagonal line A-A'. FIG. 5 is a cross-sectional view of the multi-layer ceramic capacitor 10 taken along the diagonal line B-B'.

The first internal electrode 12 includes first lead-out portions 12d, and the second internal electrode 13 includes second lead-out portions 13d. Each of the first lead-out portion 12d and the second lead-out portion 13d extends from a facing portion thereof, in which the first and second internal electrodes 12 and 13 face each other in the Z-axis direction, to the lead-out region D. The first lead-out portions 12d are exposed in the two lead-out regions D through which the diagonal line A-A' passes. The second lead-out portions 13d are exposed in the two lead-out regions D through which the diagonal line B-B' passes.

The first and second external electrodes 14 and 15 are provided to the respective lead-out regions D of the ceramic body 11. More specifically, the first external electrodes 14 cover the two lead-out regions D, in which the first lead-out portions 12d are exposed, and are connected to the first internal electrodes 12. The second external electrodes 15 cover the two lead-out regions D, in which the second lead-out portions 13d are exposed, and are connected to the second internal electrodes 13.

With this configuration, the pair of first external electrodes 14 are connected to the first lead-out portions 12d in the respective lead-out regions D and thus electrically conducted to each other via the first internal electrodes 12. Additionally, the pair of second external electrodes 15 are connected to the second lead-out portions 13d in the respective lead-out regions D and thus electrically conducted to each other via the second internal electrodes 13.

Note that the first and second external electrodes 14 and 15 only need to cover the lead-out regions D of the ceramic body 11 such that the lead-out regions D are apart from each other, and are not limited to the configuration shown in FIGS. 1, 4, and 5. For example, the first and second external electrodes 14 and 15 do not have to extend to the main surfaces M and may include gaps on at least one of the upper side or the lower side of the first side surface S1 and the second side surface S2 in the Z-axis direction.

In such a manner, the multi-layer ceramic capacitor 10 has a 4-terminal configuration in which the pair of first external electrodes 14 and the pair of second external electrodes 15 are used as four terminals. This configuration allows the multi-layer ceramic capacitor 10 to store charge corresponding to the potential difference between the pair of first external electrodes 14 and the pair of second external electrodes 15.

In the ceramic body 11, in order to increase capacitances of the respective ceramic layers provided between the first internal electrodes 12 and the second internal electrodes 13, dielectric ceramics having a high dielectric constant is used. Examples of the dielectric ceramics having a high dielectric constant include a material having a Perovskite structure containing barium (Ba) and titanium (Ti), which is typified by barium titanate ($BaTiO_3$).

Note that the ceramic layer may have a composition based on strontium titanate ($SrTiO_3$), calcium titanate ($CaTiO_3$), magnesium titanate ($MgTiO_3$), calcium zirconate ($CaZrO_3$), calcium zirconate titanate ($Ca(Zr,Ti)O_3$), barium zirconate ($BaZrO_3$), titanium oxide ($TiO_2$), or the like.

The outline size of the multi-layer ceramic capacitor 10 along the X-, Y-, and Z-axis directions can be set to, for example, 1.7*1.7*0.15 mm, 1.2*1.2*0.12 mm, 0.6*0.6*0.1 mm, 1.0*0.5*0.5 mm, 0.6*0.3*0.3 mm, and 1.0*0.5*0.15 mm.

1.2 Details of First and Second External Electrodes 14 and 15

Figure 6:
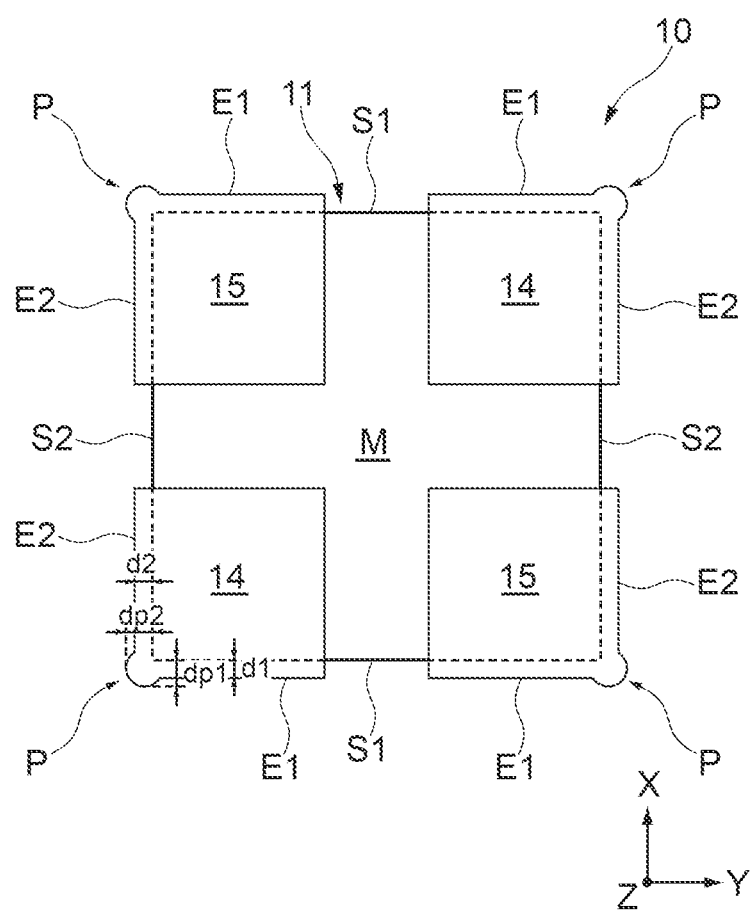
FIG. 6 is a plan view of the multi-layer ceramic capacitor.

FIG. 6 is a plan view of the multi-layer ceramic capacitor 10. Each of the first and second external electrodes 14 and 15 includes a first base portion E1, a second base portion E2, and a protrusion P. The first base portion E1 extends along the first side surface S1. The second base portion E2 extends along the second side surface S2. The protrusion P extends along the ridge R in the Z-axis direction while protruding in a hill-like shape.

In each of the first and second external electrodes 14 and 15, the protrusion P formed along the ridge R is formed to be thicker than the first and second base portions E1 and E2. In other words, in each of the first and second external electrodes 14 and 15, the protrusion P thicker than the first and second base portions E1 and E2 protrudes outward in the X-axis direction from the first base portion E1 and protrudes outward in the Y-axis direction from the second base portion E2.

FIG. 6 shows a thickness d1 of the first base portion E1, a thickness d2 of the second base portion E2, and thicknesses dp1 and dp2 of the protrusion P. The thickness dp1 of the protrusion P is defined as a maximum thickness in the X-axis direction with the first side surface S1 as a reference. The thickness dp2 of the protrusion P is defined as a maximum thickness in the Y-axis direction with the second side surface S2 as a reference.

Each of the first and second external electrodes 14 and 15 has a configuration in which, using the thicknesses d1, d2, dp1, and dp2, the thickness d1 of the first base portion E1 is smaller than the thickness dp1 of the protrusion P, and the thickness d2 of the second base portion E2 is smaller than the thickness dp2 of the protrusion P. In other words, each of the first and second external electrodes 14 and 15 satisfies the relationships of d1<dp1 and d2<dp2. The thicknesses d1 and d2 are, for example, 10 μm or more and 50 μm or less, and favorably 12 μm or more and 30 μm or less. Additionally, the thicknesses dp1 and dp2 can be set, for example, to be larger than the thicknesses d1 and d2 by 2 μm or more and 12 μm or less. In other words, the thicknesses dp1 and dp2 are, for example, 12 μm or more and 62 μm or less, and favorably 14 μm or more and 42 μm or less.

In each of the first and second external electrodes 14 and 15, the first and second base portions E1 and E2 are formed to be thin, and thus a current path in a current conduction direction at the time of using the multi-layer ceramic capacitor can be shortened. This allows equivalent series resistance (ESR) and equivalent series inductance (ESL) to be kept small in the multi-layer ceramic capacitor 10.

Additionally, in the first and second external electrodes 14 and 15, the first and second base portions E1 and E2 are formed to be thin, and thus the internal stress is reduced accordingly. This makes it difficult to cause the peeling of the first and second base portions E1 and E2 of the first and second external electrodes 14 and 15 due to a thermal stress or a mechanical stress to be applied at the time of mounting or using the multi-layer ceramic capacitor 10, and thus high reliability can be ensured.

On the other hand, in the ceramic body 11, the stress resulting from an external shock tends to concentrate on each ridge R with a convexly curved shape, and thus cracks may be generated at the ridge R. If the ceramic body 11 having cracks at the ridges R undergoes the entry of moisture from the ridges R along the cracks, the first internal electrodes 12 and the second internal electrodes 13 are liable to be short-circuited.

In this regard, in the first and second external electrodes 14 and 15 of the multi-layer ceramic capacitor 10, each protrusion P having a large thickness is capable of reliably protecting a corresponding ridge R of the ceramic body 11. Thus, in the multi-layer ceramic capacitor 10, each protrusion P of the first and second external electrodes 14 and 15 is capable of effectively shielding a corresponding ridge R of the ceramic body 11 from an external environment.

With this configuration, the moisture present in the external environment is difficult to reach the ridges R in the ceramic body 11, and thus the entry of moisture to the inside is difficult to occur even if the ridges R have cracks. Thus, in the multi-layer ceramic capacitor 10, the short circuit is prevented from occurring, and higher reliability can be ensured.

As shown in FIGS. 4 and 5, each of the first and second external electrodes 14 and 15 includes an underlayer L1 and a plating layer L2. The underlayer L1 is the innermost layer in each of the first and second external electrodes 14 and 15 and is adjacent to the lead-out region D of the ceramic body 11. The plating layer L2 is formed on the outside of the underlayer L1, that is, covers the lead-out region D of the ceramic body 11 via the underlayer L1.

The underlayers L1 and the plating layers L2 that constitute the first and second external electrodes 14 and 15 are each formed of a good conductor of electricity. Examples of the good conductor of electricity forming the first and second external electrodes 14 and 15 include a metal mainly containing copper (Cu), nickel (Ni), tin (Sn), palladium (Pd), platinum (Pt), silver (Ag), gold (Au), or the like or an alloy of them.

The underlayer L1 is provided as a base for forming the plating layer L2 by a wet plating method. In each of the first and second external electrodes 14 and 15, the underlayer L1 is formed as a sputtered film by a sputtering method, which can achieve a reduction in thickness as a whole. Note that the method of forming the underlayer L1 is not limited to the sputtering method, and other publicly known techniques can be used instead.

For example, the underlayer L1 may be a thin film formed by a vacuum film deposition method other than the sputtering method. Examples of the vacuum film deposition method capable of forming the underlayer L1 other than the sputtering method include a vacuum vapor deposition method, a chemical vapor deposition (CVD) method, and an atomic layer deposition (ALD) method.

In each of the first and second external electrodes 14 and 15, the plating layer L2, which is located on the underlayer L1 formed to be thin by the sputtering method or the like, is provided with a thickness distribution, so that the first and second base portions E1 and E2 with a small thickness and the protrusion P with a large thickness can be formed. The method of forming the first and second external electrodes 14 and 15 including the first and second base portions E1 and E2 and the protrusions P will be described later in detail.

2. Production Method for Multi-Layer Ceramic Capacitor 10

Figure 7:
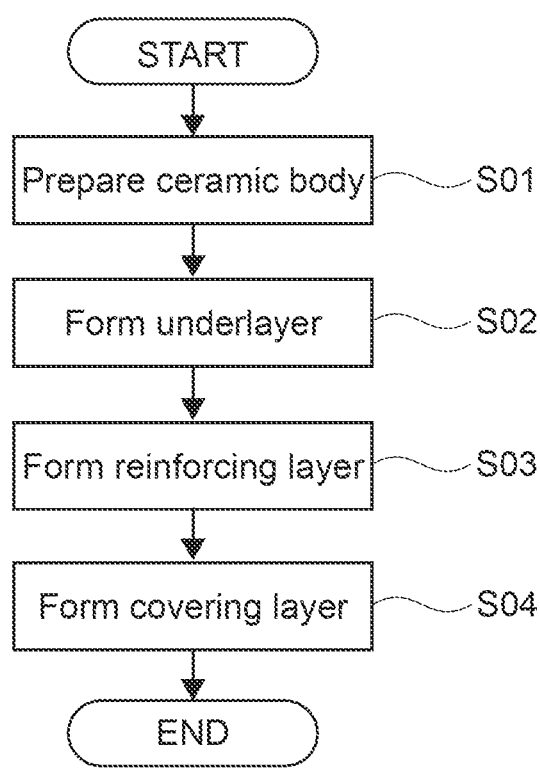
FIG. 7 is a flowchart showing a production method for the multi-layer ceramic capacitor.

FIG. 7 is a flowchart showing an example of a production method for the multi-layer ceramic capacitor 10 according to this embodiment. FIGS. 8 to 14 are views each showing a production process for the multi-layer ceramic capacitor 10. Hereinafter, the production method for the multi-layer ceramic capacitor 10 will be described according to FIG. 7 with reference to FIGS. 8 to 14 as appropriate.

2.1 Step S01: Preparation of Ceramic Body

In Step S01, the ceramic body 11 shown in FIG. 2 or the like is prepared. In Step S01, for example, a laminate of dielectric green sheets, on which the first internal electrodes 12 and the second internal electrodes 13 are printed with a pattern shown in FIG. 3, is sintered, so that the ceramic body 11 can be prepared. Note that the method of preparing the ceramic body 11 is not limited to such a configuration.

2.2 Step S02: Formation of Underlayer

Figure 8:
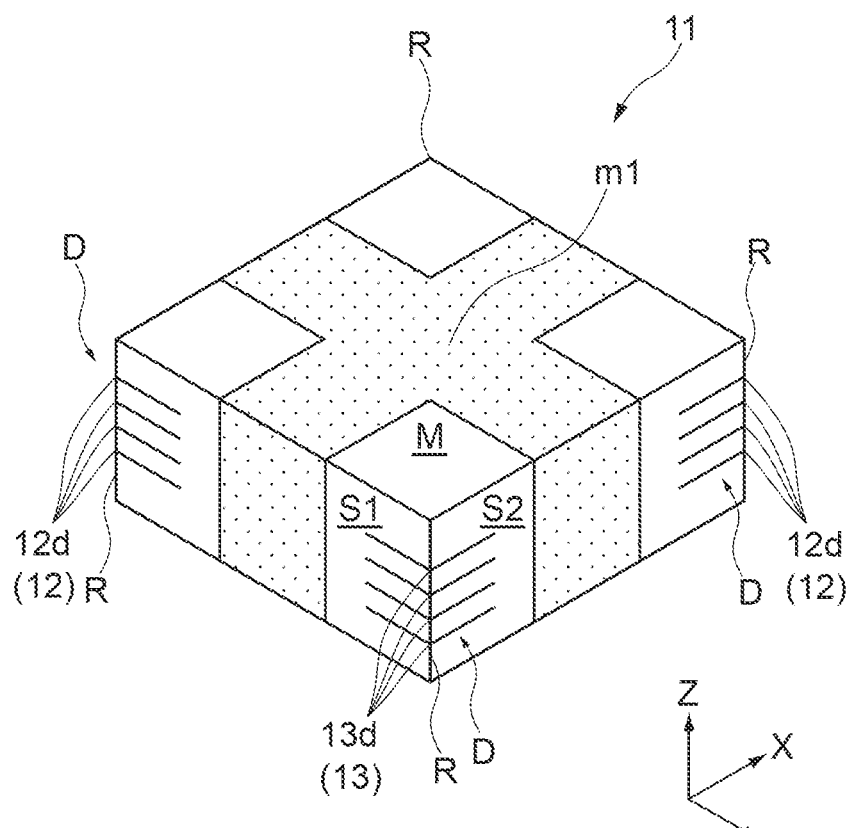
FIG. 8 is a perspective view showing a process of forming an underlayer in the production method.
Figure 9:
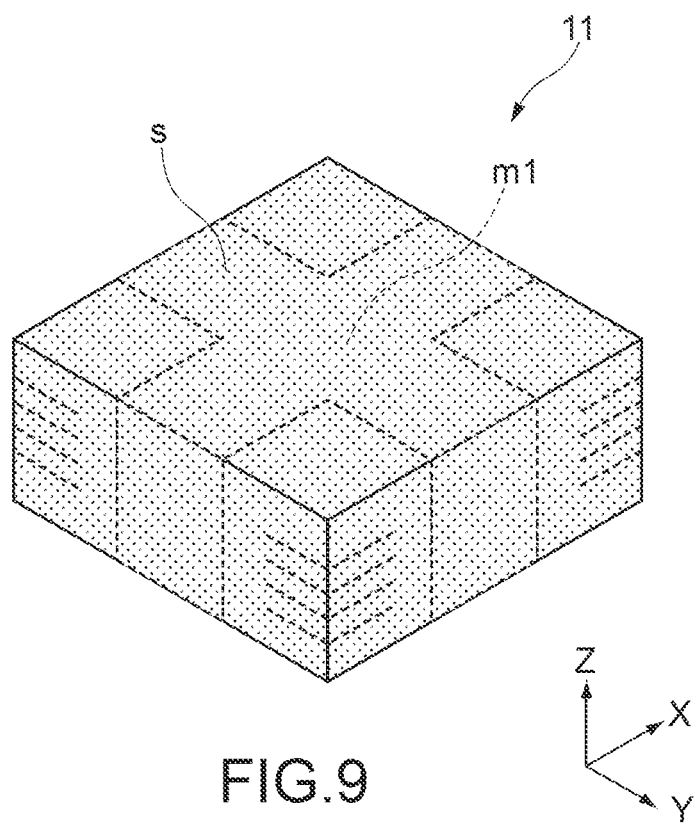
FIG. 9 is a perspective view showing the process of forming the underlayer in the production method.
Figure 10:
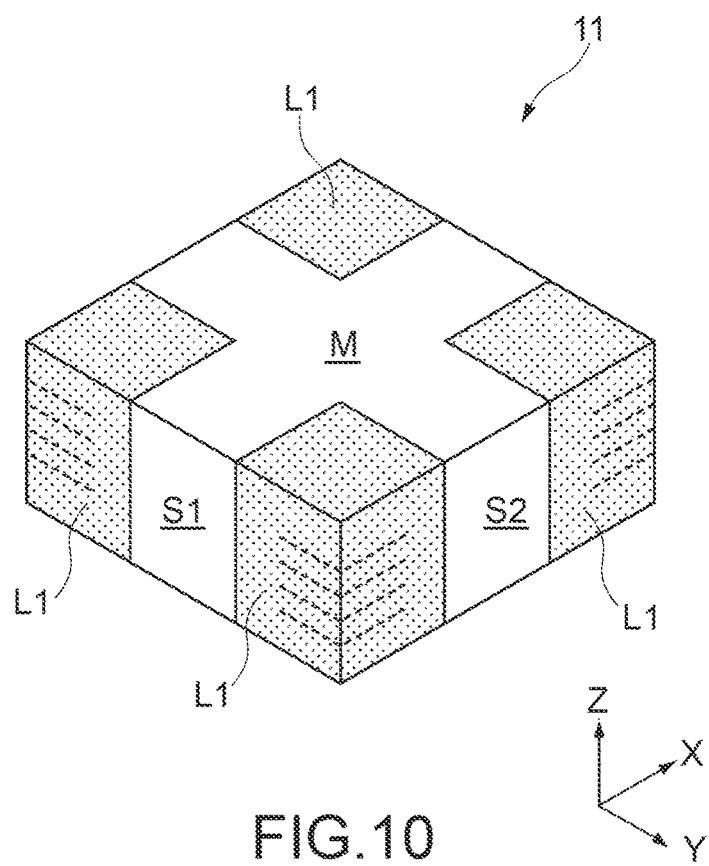
FIG. 10 is a perspective view of the ceramic body in which the underlayer is formed in the production method.

In Step S02, the underlayers L1 are formed in the four respective lead-out regions D of the ceramic body 11 prepared in Step S01. The underlayers L1 can be prepared by, for example, using the vacuum film deposition method as described above. Examples of the material forming the underlayers L1 include copper (Cu). FIGS. 8 to 10 are perspective views each showing a process of forming the underlayers L1 by the sputtering method in Step S02.

First, as shown in FIG. 8, a mask m1 is formed, in which regions for the underlayers L1, including the lead-out regions D, are opened on the outer surface of the ceramic body 11. The mask m1 can be formed by an optional publicly known technique. This allows the portions for the underlayers L1 to be exposed from the mask m1 on the ceramic body 11.

Next, as shown in FIG. 9, a sputtered film s is formed by the sputtering method over the entre outer surface of the ceramic body 11 on which the mask m1 shown in FIG. 8 is formed. In such a manner, in the ceramic body 11, the sputtered film s is formed not only in the portions where the underlayers L1 are to be provided but also on the mask m1.

Subsequently, as shown in FIG. 10, the mask m1 is peeled off from the ceramic body 11 on which the sputtered film s shown in FIG. 9 is formed. As a result, in the ceramic body 11, the portion of the sputtered film s on the mask m1 is removed together with the mask m1, and the sputtered films s left in the regions including the lead-out regions D become the underlayers L1.

2.3 Step S03: Formation of Reinforcing Layer

Figure 11:
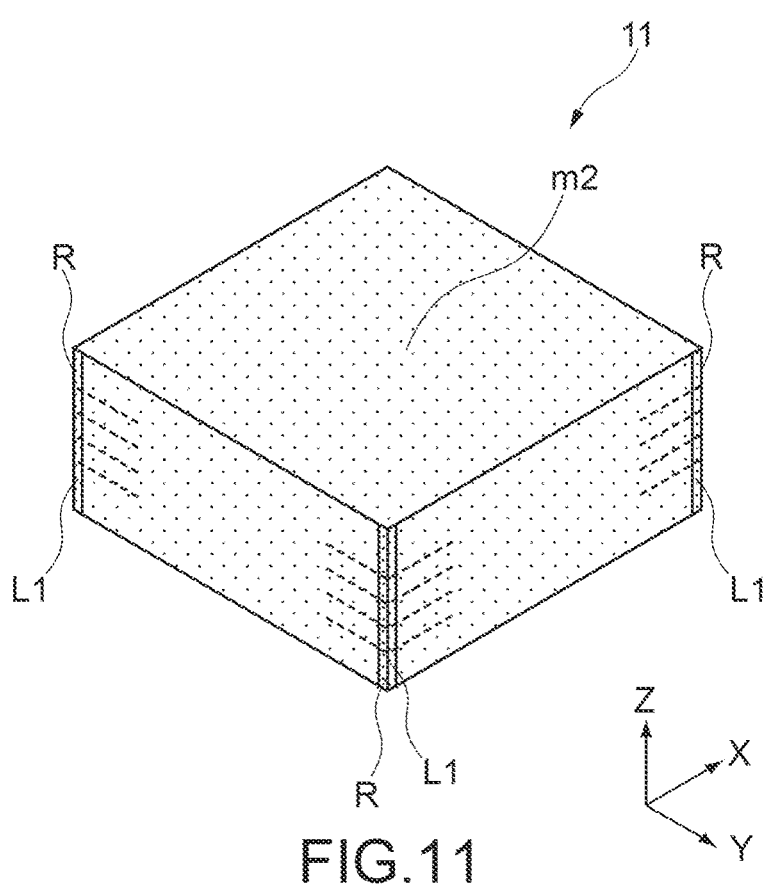
FIG. 11 is a perspective view showing a process of forming a reinforcing layer in the production method.
Figure 12:
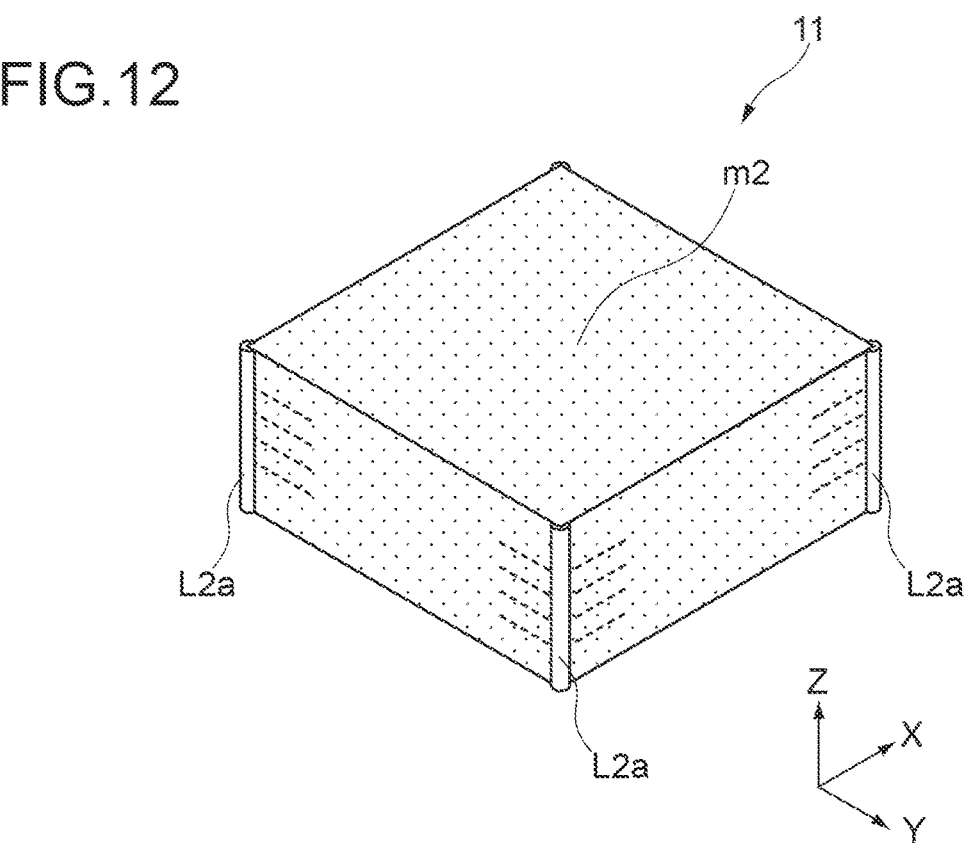
FIG. 12 is a perspective view showing the process of forming the reinforcing layer in the production method.
Figure 13:
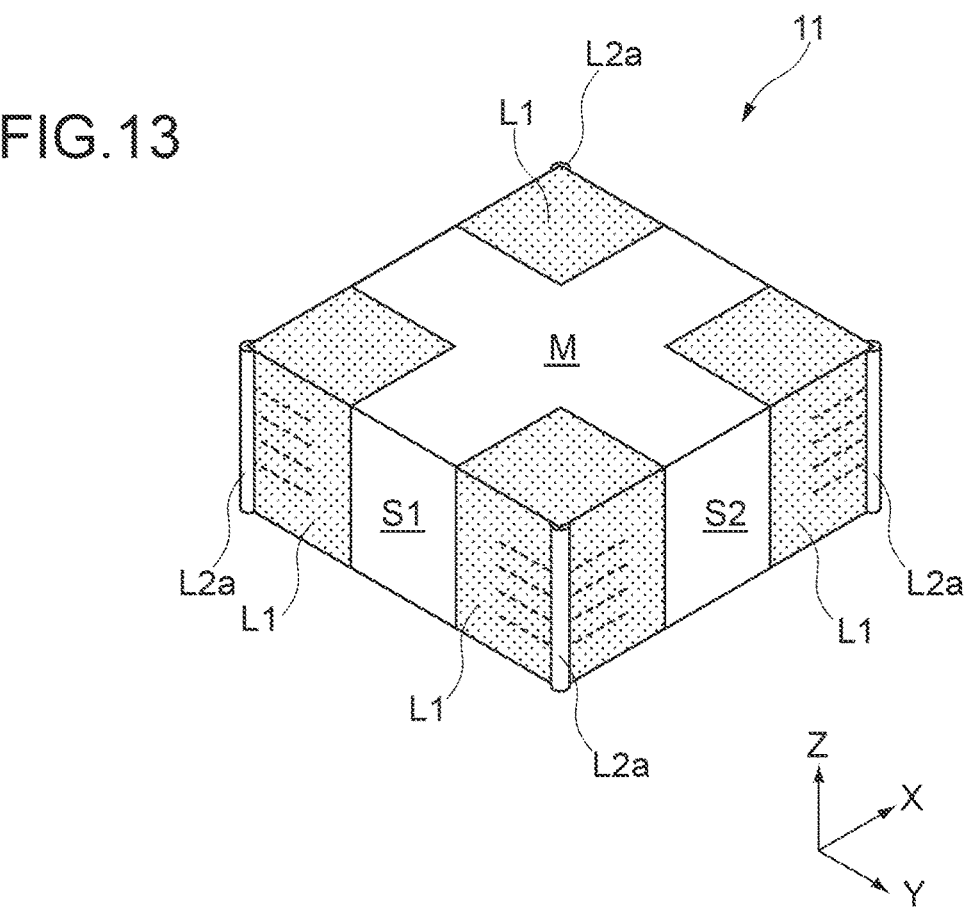
FIG. 13 is a perspective view of the ceramic body in which the reinforcing layer is formed in the production method.

In Step S03, reinforcing layers L2a are formed on the ceramic body 11 on which the underlayers L1 are formed in Step S02. Each reinforcing layer L2a is formed as a part of the plating layer L2 in a region near the ridge R of the ceramic body 11 by a wet plating method. The material forming the reinforcing layers L2a can be similar to that of the underlayers L1, and copper (Cu) can be used, for example. FIGS. 11 to 13 are perspective views each showing a process of forming the reinforcing layers L2a in Step S03.

First, as shown in FIG. 11, an insulating mask m2 is formed, in which regions near the ridges R for providing the reinforcing layers L2a are opened on the outer surface of the ceramic body 11. The mask m2 can be formed by an optional publicly known technique. This allows the regions near the ridges R for providing the reinforcing layers L2a to be exposed from the mask m2 on the ceramic body 11.

Subsequently, as shown in FIG. 12, treatment by the wet plating method is performed on the ceramic body 11 on which the mask m2 shown in FIG. 11 is formed, and thus the reinforcing layers L2a can be formed in the regions near the ridges R exposed from the mask m2 on the ceramic body 11. As shown in FIG. 13, the mask m2 is peeled off from the ceramic body 11 afterward.

2.4 Step S04: Formation of Covering Layer

In Step S04, covering layers L2b are formed on the ceramic body 11 on which the reinforcing layers L2a are formed in Step S03. Each covering layer L2b constitutes the plating layer L2 together with the reinforcing layer L2a. The covering layers L2b are formed on the reinforcing layers L2a by the wet plating method, that is, cover the lead-out regions D and the underlayers L1 over the reinforcing layers L2a. Each covering layer L2b does not need to be a single plating layer and may include a plurality of plating layers including a nickel (Ni) layer and a tin (Sn) layer.

Figure 14:
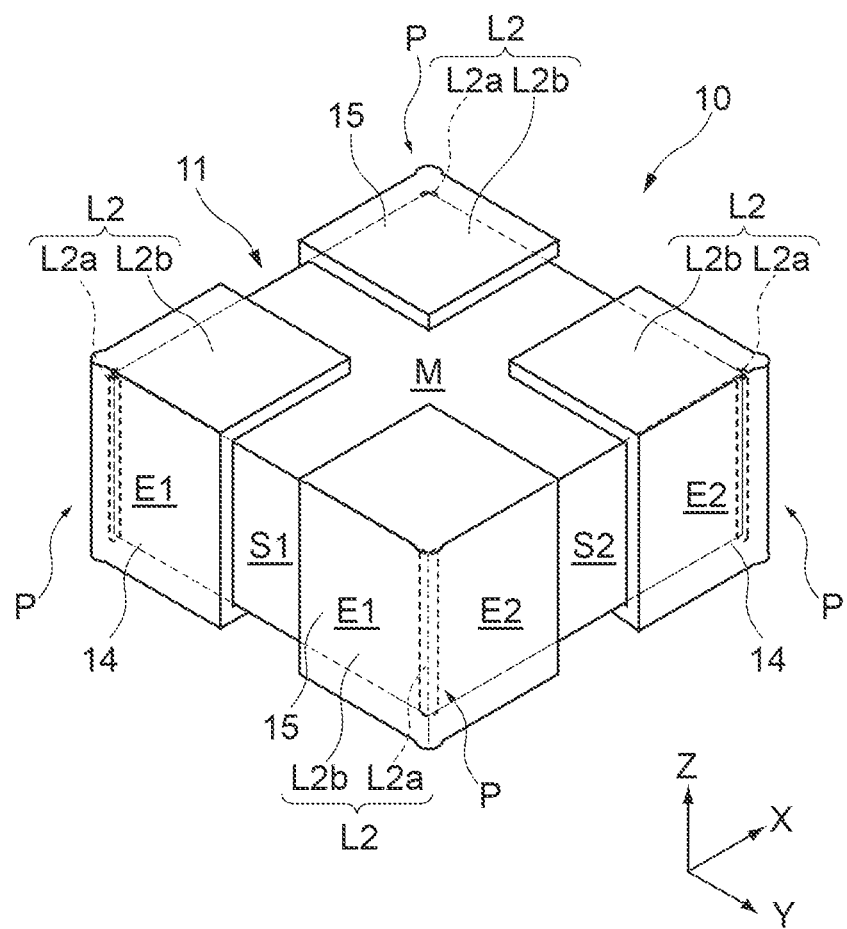
FIG. 14 is a perspective view of the ceramic body in which the reinforcing layer is formed in the production method.

With this configuration, as shown in FIG. 14, the plating layer L2 includes the first and second base portions E1 and E2 formed by the covering layer L2b, and the protrusion P having a larger thickness than the thicknesses of the first and second base portions E1 and E2 by the thickness of the reinforcing layer L2a, which raises the height of the covering layer L2b. Through the above steps, the multi-layer ceramic capacitor 10 according to this embodiment is obtained.

II Second Embodiment

Figure 15:
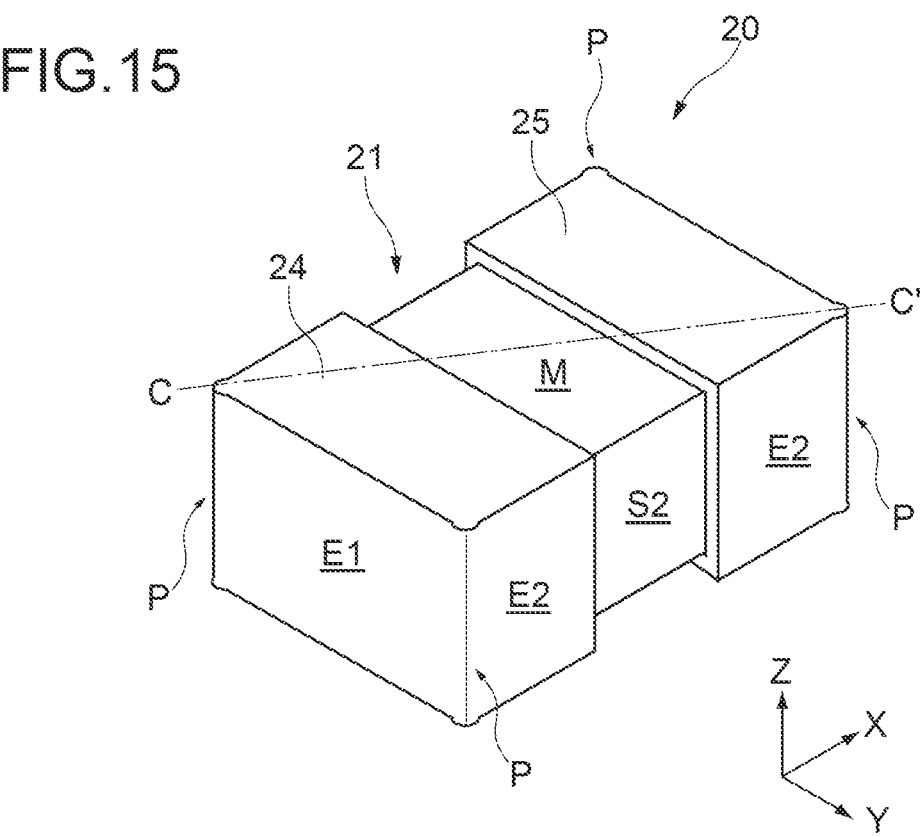
FIG. 15 is a perspective view of a multi-layer ceramic capacitor according to a second embodiment of the present disclosure.

FIG. 15 is a perspective view of the multi-layer ceramic capacitor 20 according to the second embodiment of the present disclosure. The multi-layer ceramic capacitor 20 according to this embodiment has a 2-terminal configuration, unlike the 4-terminal configuration of the first embodiment. In the description of this embodiment, description on the configuration similar to that of the first embodiment will be omitted as appropriate.

The multi-layer ceramic capacitor 20 includes a ceramic body 21, a first external electrode 24, and a second external electrode 25. The first external electrode 24 and the second external electrode 25 are provided apart from each other on the outer surface of the ceramic body 21. The first external electrode 24 and the second external electrode 25 each include an underlayer L1 and a plating layer L2, similarly to the first and second external electrodes 14 and 15 of the first embodiment.

Figure 16:
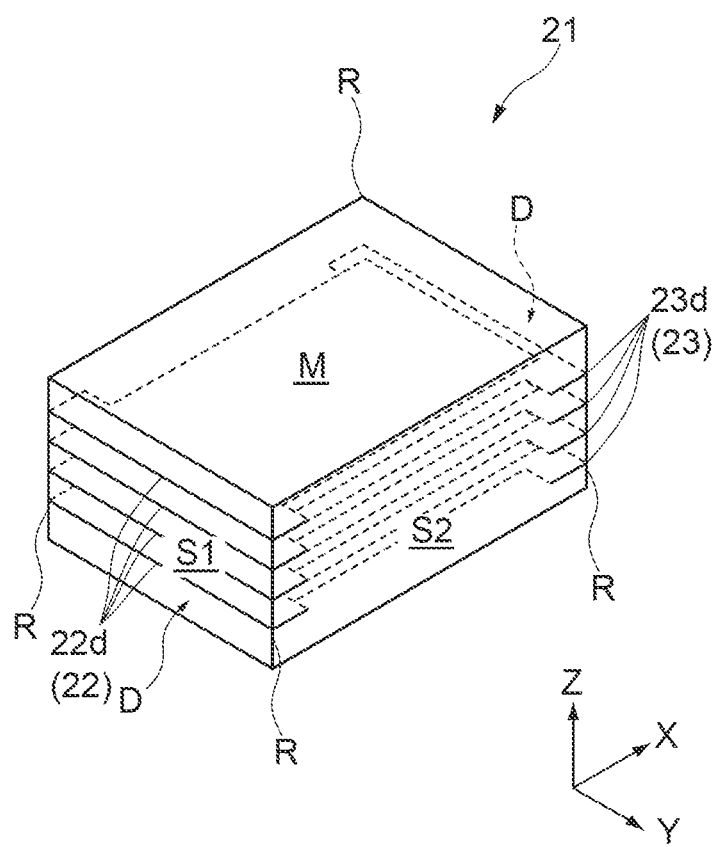
FIG. 16 is a perspective view of a ceramic body of the multi-layer ceramic capacitor.

FIG. 16 is a perspective view of the ceramic body 21. The ceramic body 21 includes a pair of first side surfaces S1 extending along the Y-Z plane, a pair of second side surfaces S2 extending along the X-Z plane, and a pair of main surfaces M extending along the X-Y plane. Additionally, the ceramic body 21 includes four ridges R that connect the pair of first side surfaces S1 and the pair of second side surfaces S2 to each other.

Figure 17:
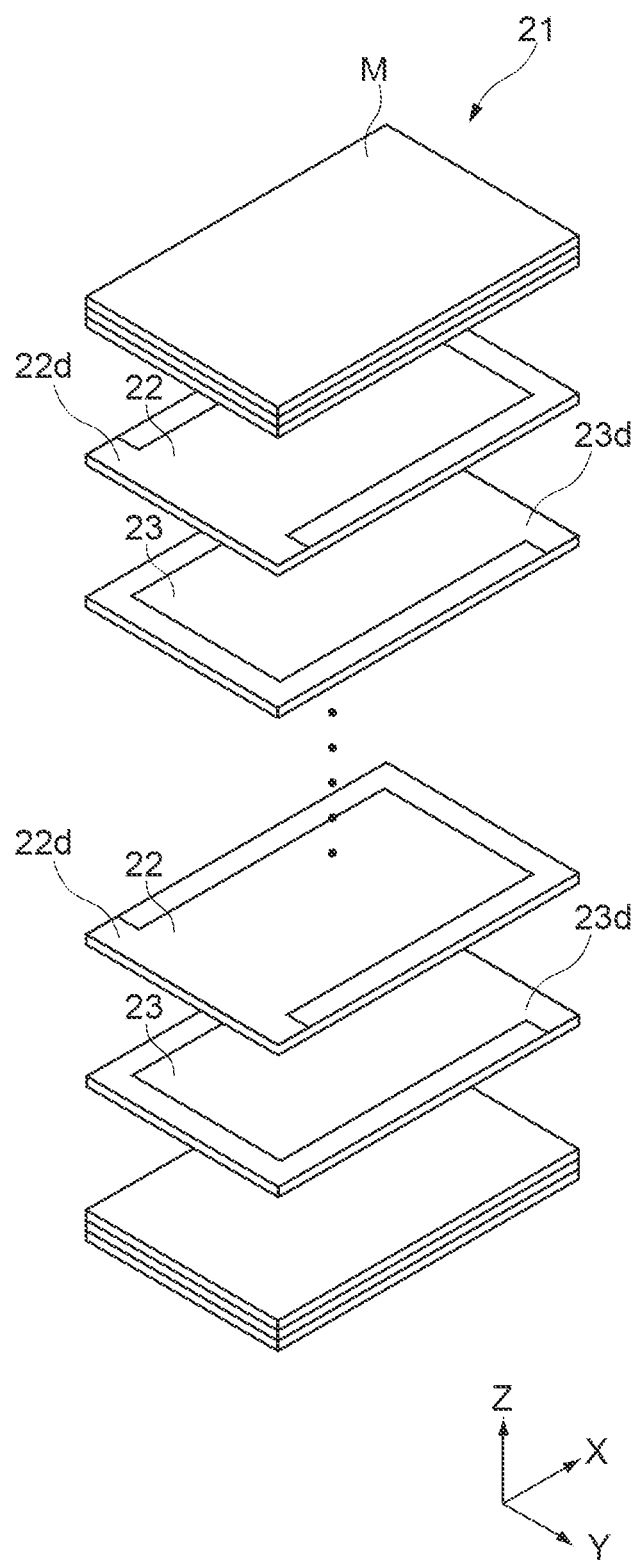
FIG. 17 is an exploded perspective view of the ceramic body.
Figure 18:
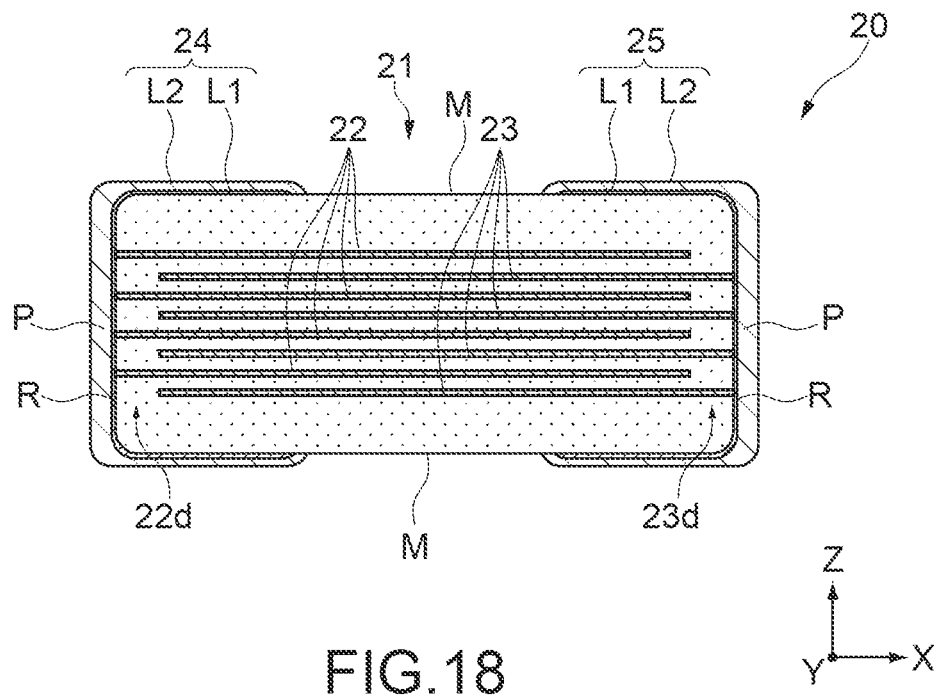
FIG. 18 is a cross-sectional view of the multi-layer ceramic capacitor taken along the diagonal line C-C' in FIG. 15.

FIG. 17 is an exploded perspective view of a part of the laminated structure of the ceramic body 21. FIG. 18 is a cross-sectional view of the multi-layer ceramic capacitor 20 taken along the diagonal line C-C' shown in FIG. 15. The ceramic body 21 includes a plurality of first internal electrodes 22 and a plurality of second internal electrodes 23. Each first internal electrode 22 includes a first lead-out portion 22d, and each second internal electrode 23 includes a second lead-out portion 23d.

In the ceramic body 21, a pair of lead-out regions D are provided in the pair of first side surfaces S1. Each lead-out region D extends from the first side surface S1 to the pair of second side surfaces S2 through the ridges R. The first lead-out portions 22d of the first internal electrodes 22 and the second lead-out portions 23d of the second internal electrodes 23 are alternately led out in the pair of lead-out regions D along the Z-axis direction.

The first and second external electrodes 24 and 25 are provided in the respective lead-out regions D of the ceramic body 21. More specifically, the first external electrode 24 covers the lead-out region D, in which the first lead-out portions 22d are exposed, and is connected to the first internal electrodes 22. The second external electrode 25 covers the lead-out regions D, in which the second lead-out portions 23d are exposed, and is connected to the second internal electrodes 23.

In such a manner, the multi-layer ceramic capacitor 20 has a 2-terminal configuration in which the first external electrode 24 and the second external electrode 25 are used as two terminals. This configuration allows the multi-layer ceramic capacitor 20 to store charge corresponding to the potential difference between the first external electrode 24 and the second external electrode 25.

Figure 19:
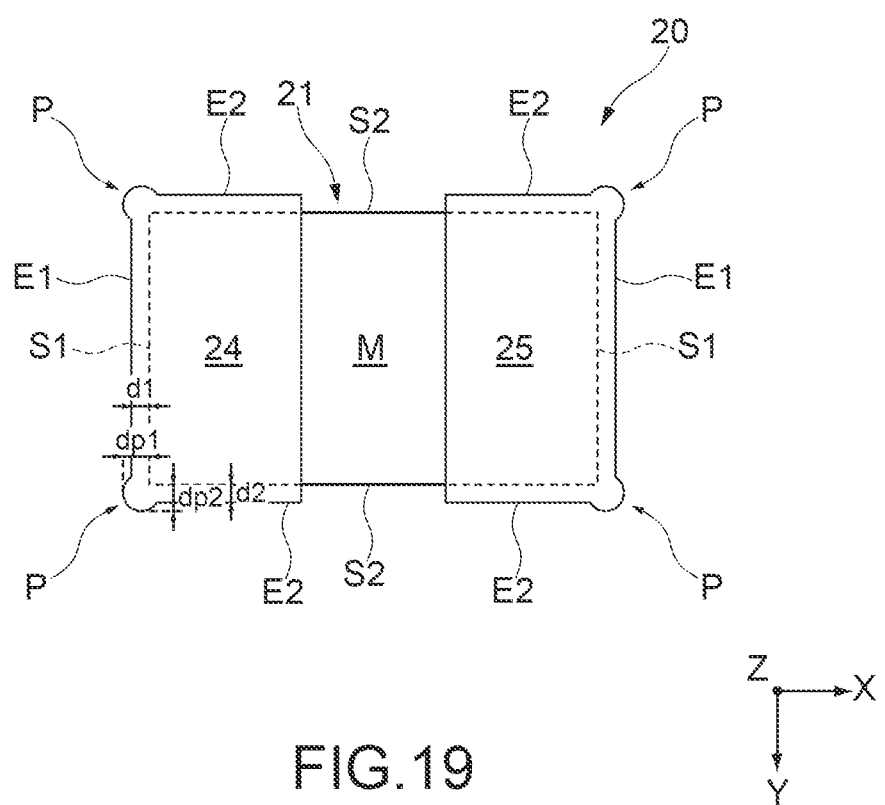
FIG. 19 is a plan view of the multi-layer ceramic capacitor.

FIG. 19 is a plan view of the multi-layer ceramic capacitor 20. Each of the first external electrode 24 and the second external electrode 25 includes protrusions P, a first base portion E1, and second base portions E2. The protrusions P extend along the two respective ridges R in the Z-axis direction while protruding in a hill-like shape. The first base portion E1 extends between the protrusions P along the first side surface S1. Each of the second base portions E2 extends from a corresponding protrusion P along the second side surface S2.

In each of the first and second external electrodes 24 and 25, the protrusion P formed along the ridge R is formed to be thicker than the first and second base portions E1 and E2. In other words, in each of the first and second external electrodes 24 and 25, the protrusion P thicker than the first and second base portions E1 and E2 protrudes outward in the X-axis direction from the first base portion E1 and protrudes outward in the Y-axis direction from the second base portion E2.

Thus, as shown in FIG. 19, each of the first and second external electrodes 24 and 25 has a configuration in which a thickness d1 of the first base portion E1 is smaller than a thickness dp1 of the protrusion P, and a thickness d2 of the second base portion E2 is smaller than a thickness dp2 of the protrusion P. In other words, each of the first and second external electrodes 24 and 25 satisfies the relationships of d1<dp1 and d2<dp2. The thicknesses d1 and d2 are, for example, 10 µm or more and 50 µm or less, and favorably 12 µm or more and 30 µm or less. Additionally, the thicknesses dp1 and dp2 can be set, for example, to be larger than the thicknesses d1 and d2 by 2 µm or more and 12 µm or less. In other words, the thicknesses dp1 and dp2 are, for example, 12 µm or more and 62 µm or less, and favorably 14 µm or more and 42 µm or less.

In each of the first and second external electrodes 24 and 25, the first and second base portions E1 and E2 are formed to be thin, and thus a current path in a current conduction direction at the time of using the multi-layer ceramic capacitor can be shortened. This allows the ESR and the ESL to be kept small in the multi-layer ceramic capacitor 20.

Additionally, in the first and second external electrodes 24 and 25, the first and second base portions E1 and E2 are formed to be thin, and thus the internal stress is reduced accordingly. This makes it difficult to cause the peeling of the first and second base portions E1 and E2 of the first and second external electrodes 24 and 25 due to a thermal stress or a mechanical stress to be applied at the time of mounting or using the multi-layer ceramic capacitor 20, and thus high reliability can be ensured.

Further, in the first and second external electrodes 24 and 25, each protrusion P having a large thickness is capable of reliably protecting a corresponding ridge R of the ceramic body 21. Thus, in the multi-layer ceramic capacitor 20, each protrusion P of the first and second external electrodes 24 and is capable of effectively shielding a corresponding ridge R of the ceramic body 21 from an external environment.

With this configuration, the moisture present in the external environment is difficult to reach the ridges R in the ceramic body 21, and thus the entry of moisture to the inside is difficult to occur even if the ridges R have cracks. Thus, in the multi-layer ceramic capacitor 20, the short circuit is prevented from occurring, and higher reliability can be ensured.

III Other Embodiments

While the embodiments of the present disclosure have been described, the present disclosure is not limited to the embodiments described above, and it should be appreciated that the present disclosure may be variously modified.

For example, the external electrode only needs to include the protrusions P extending along the ridges R of the ceramic body and protruding in the X- and Y-axis directions, and is not limited to the configurations described above. In other words, the external electrode may include a layer different from the underlayer L1 and the plating layer L2 and may exclude at least one of the underlayer L1 or the plating layer L2.

Additionally, in the ceramic body, the lead-out region D in which the internal electrodes are led out does not include the ridge R. In other words, in the multi-layer ceramic capacitor, the entry of moisture along the cracks from the ridge R is prevented also in the ceramic body having a configuration in which the internal electrodes are not led out at the ridge R, and the occurrence of a short circuit is thus suppressed.

Further, the method of forming the reinforcing layer in the plating layer of each external electrode is not limited to the wet plating method. For example, a dry plating method such as a sputtering method may be used.

Figure 20:
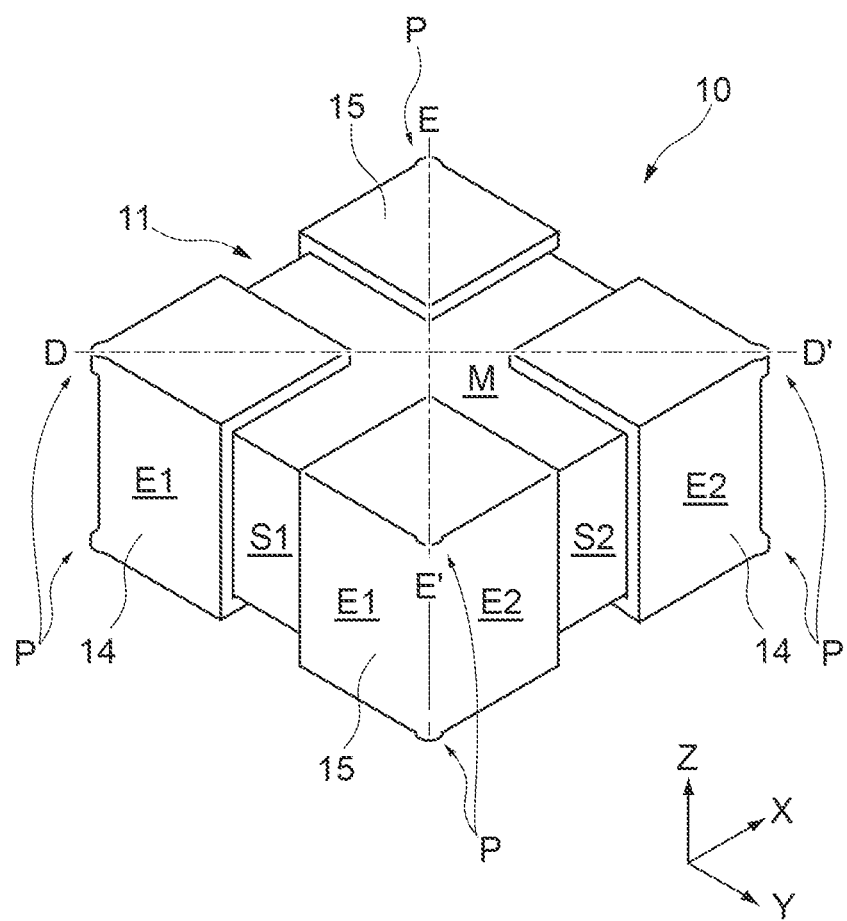
FIG. 20 is a perspective view of a multi-layer ceramic capacitor according to a modified example of the first embodiment.
Figure 21:
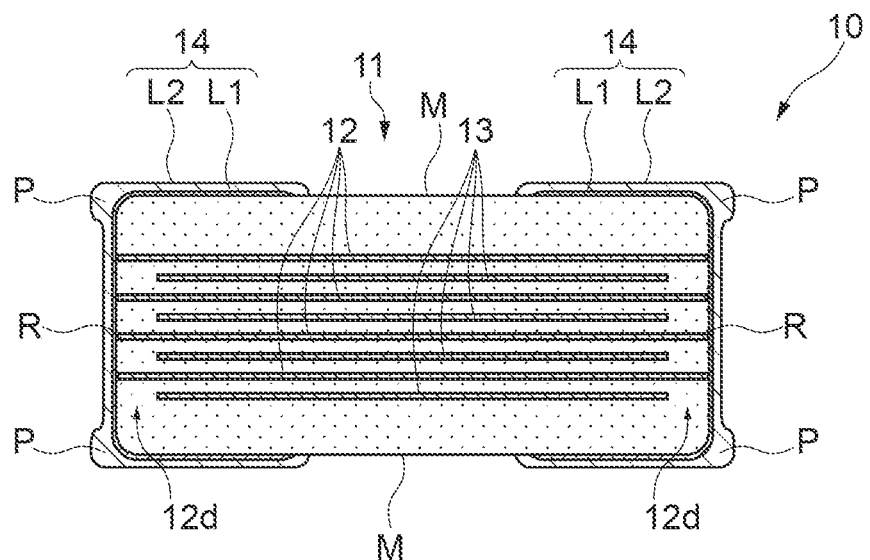
FIG. 21 is a cross-sectional view of the multi-layer ceramic capacitor taken along the diagonal line D-D' in FIG. 20.
Figure 22:
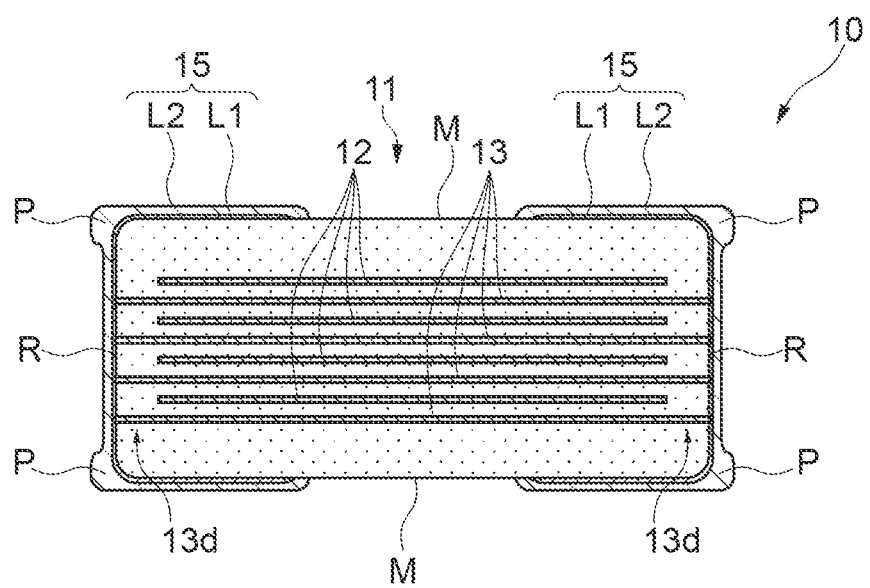
FIG. 22 is a cross-sectional view of the multi-layer ceramic capacitor taken along the diagonal line E-E' in FIG. 20.

In addition, the protrusion P does not need to extend over the entire range of the ridge R in each external electrode. For example, as shown in FIGS. 20 to 22, the protrusion P of each external electrode may be formed at at least one of both ends of the ridge R in the Z-axis direction. Also in the multi-layer ceramic capacitor having such a configuration, a corner portion, at which three surfaces of the main surface M, the first side surface S1, and the second side surface S2 intersect with one another, and which is the most susceptible to mechanical damage in the ceramic body, can be adequately protected by the protrusion P of the external electrode, and high reliability is thus provided.

Additionally, the multi-layer ceramic capacitor has a configuration in which the maximum dimension in the Z-axis direction is smaller than the maximum dimensions in the X- and Y-axis directions, and thus the ESR and the ESL obtained when the multi-layer ceramic capacitor is mounted on a substrate can be further reduced. In this case, the maximum dimension of the multi-layer ceramic capacitor in the Z-axis direction is favorably 50 μm or more and 150 μm or less, more favorably 60 μm or more and 120 μm or less, and further favorably 60 μm or more and 75 μm or less.

Further, the above embodiments have described the multi-layer ceramic capacitors as examples of a multi-layer ceramic electronic component, but the present disclosure is applicable to general multi-layer ceramic electronic components. Examples of such multi-layer ceramic electronic components include a chip varistor, a chip thermistor, and a multi-layer inductor.

What is claimed is:

1. A multi-layer ceramic electronic component, comprising:
a ceramic body including
a first side surface facing in a direction of a first axis,
a second side surface facing in a direction of a second axis orthogonal to the first axis,
a ridge that connects the first side surface and the second side surface to each other, and
internal electrodes laminated along a third axis orthogonal to the first axis and the second axis and led out in a lead-out region; and
an external electrode including
a protrusion provided at and along the ridge and extending over a length of the external electrode in a direction of the third axis, and
a first base portion and a second base portion extending from the protrusion along the first side surface and the second side surface, respectively,
the external electrode covering the lead-out region,
wherein the protrusion protrudes with respect to a plane defined by a surface of the first base portion in the direction of the first axis and with respect to a plane defined by a surface of the second base portion in the direction of the second axis.

2. The multi-layer ceramic electronic component according to claim 1, wherein
the lead-out region includes the ridge.

3. The multi-layer ceramic electronic component according to claim 1, wherein
the external electrode further includes a plating layer and an underlayer disposed between the plating layer and the lead-out region.

4. The multi-layer ceramic electronic component according to claim 3, wherein
the underlayer includes a sputtered film.

5. The multi-layer ceramic electronic component according to claim 1, wherein
a maximum dimension of the multi-layer ceramic electronic component in a direction of the third axis is smaller than maximum dimensions of the multi-layer ceramic electronic component in the directions of the first axis and the second axis.

6. The multi-layer ceramic electronic component according to claim 5, wherein
the maximum dimension of the multi-layer ceramic electronic component in the direction of the third axis is 50 μm or more and 150 μm or less.

7. The multi-layer ceramic electronic component according to claim 6, wherein
the maximum dimension of the multi-layer ceramic electronic component in the direction of the third axis is 60 μm or more and 120 μm or less.

8. The multi-layer ceramic electronic component according to claim 7, wherein
the maximum dimension of the multi-layer ceramic electronic component in the direction of the third axis is 60 μm or more and 75 μm or less.

9. A method of producing a multi-layer ceramic electronic component, comprising:
preparing a ceramic body including
a first side surface facing in a direction of a first axis,
a second side surface facing in a direction of a second axis orthogonal to the first axis, a ridge that connects the first side surface and the second side surface to each other, and internal electrodes laminated along a third axis orthogonal to the first axis and the second axis and led out in a lead-out region;

forming an underlayer in the lead-out region by a vacuum film deposition method; and forming a plating layer including a protrusion extending along the ridge in a direction of the third axis and protruding in the directions of the first axis and the second axis, and a first base portion and a second base portion extending from the protrusion along the first side surface and the second side surface, respectively, the plating layer covering the lead-out region via the underlayer, wherein the protrusion protrudes with respect to a plane defined by a surface of the first base portion in the direction of the first axis and with respect to a plane defined by a surface of the second base portion in the direction of the second axis.

10. The method of producing a multi-layer ceramic electronic component according to claim 9, wherein the lead-out region includes the ridge.

11. The method of producing a multi-layer ceramic electronic component according to claim 9, wherein the forming a plating layer includes forming a reinforcing layer that extends along the ridge, and forming a covering layer that covers the lead-out region over the reinforcing layer.

12. The method of producing a multi-layer ceramic electronic component according to claim 9, wherein the vacuum film deposition method includes a sputtering method.

13. A multi-layer ceramic electronic component, comprising:

a ceramic body including a first side surface facing in a direction of a first axis, a second side surface facing in a direction of a second axis orthogonal to the first axis, a ridge that connects the first side surface and the second side surface to each other, and internal electrodes laminated along a third axis orthogonal to the first axis and the second axis and led out in a lead-out region; and an external electrode including a protrusion protruding in the directions of the first axis and the second axis, and disposed at least one of both ends of the ridge in a direction of the third axis, and a first base portion and a second base portion extending from the protrusion along the first side surface and the second side surface, respectively, the external electrode covering the lead-out region, wherein the protrusion protrudes with respect to a plane defined by a surface of the first base portion in the direction of the first axis and with respect to a plane defined by a surface of the second base portion in the direction of the second axis.

* * * * *